United States Patent [19]

Kupfer

[11] 4,018,680
[45] Apr. 19, 1977

[54] PROCESS FOR SEPARATING IRON, ZINC AND LEAD FROM FLUE DUST AND/OR FLUE SLUDGE

[75] Inventor: Rudolf Kupfer, Zurich, Switzerland
[73] Assignee: Vol Roll A.G., Switzerland
[22] Filed: Feb. 24, 1976
[21] Appl. No.: 661,040
[52] U.S. Cl. .................................. 210/50; 210/53; 75/25; 75/108; 75/120; 423/92; 423/104; 423/140
[51] Int. Cl.² .......................................... C22B 7/02
[58] Field of Search .................. 210/42, 45, 47, 49, 210/51-53, 60, 59, 199, 195, 201; 423/104, 144, 92, 93, 140, 142, 102; 75/108, 25, 120

[56] References Cited

UNITED STATES PATENTS

| | | | |
|---|---|---|---|
| 2,151,261 | 3/1939 | Bartlett | 210/53 |
| 3,102,789 | 9/1963 | Pirsh et al. | 210/50 |
| 3,188,201 | 6/1965 | Sontheimer | 75/25 |

OTHER PUBLICATIONS

Myatt R. T. et al.; "The Treatment of Blast Furnace Gas Washing Effluent" Iron and Steel International; vol. 46, 5, pp. 421-424, (1973).

Culp G. L. et al.; "New Concepts In Water Purification", Van Nostrand Reinhold Company; (1974), pp. 218-221.

Primary Examiner—Frank A. Spear, Jr.
Assistant Examiner—Benoit Castel
Attorney, Agent, or Firm—Roylance, Abrams, Berdo & Kaul

[57] ABSTRACT

There is disclosed a process for separating iron, zinc and lead from flue dust and/or flue sludge, wherein the three following reaction stages are performed in the aqueous phase:
a. Oxidation of the iron and filtration of the resulting first turbid liquid;
b. Suspension and acidification of a first filtration residue and subsequent filtration of the resulting second turbid liquid, whereby a second filtration residue containing mainly iron sludge is obtained;
c. Neutralization of the filtrate and subsequent filtration of the resulting third turbid liquid, whereby a third filtration residue containing the precipated heavy metals is obtained.

4 Claims, 1 Drawing Figure

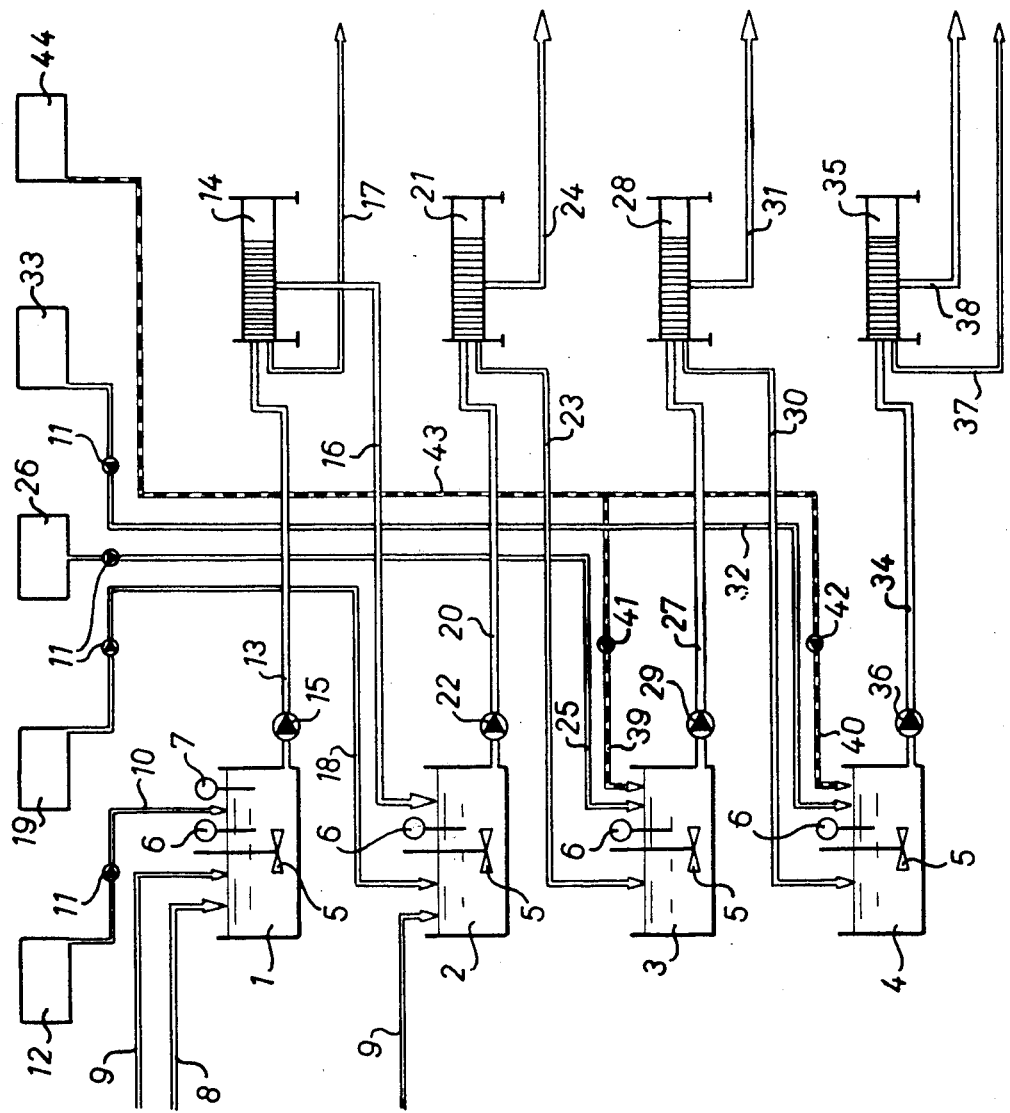

PROCESS FOR SEPARATING IRON, ZINC AND LEAD FROM FLUE DUST AND/OR FLUE SLUDGE

BACKGROUND OF THE INVENTION

The present invention relates to a process for separating iron, zinc and lead from flue dust and/or flue sludge by filtration.

Flue gases, particularly from blast furnaces carry a considerable quantity of flue dust, i.e., large and small particles of fine ore, coke dust and the like. In order to permit its further use as a fuel gas in furnaces, hearths and machines, cleaning is necessary which involves the use of conventional dust removal and/or gas cleaning methods, for example using scrubbers, centrifugal separators, as well as mechanical and electrostatic precipitators. Most of the flue gas and/or sludge obtained through cleaning the gas is again fed to the blast furnace after prior sintering.

In addition to iron and carbon, the flue dust and/or sludge also contains heavy metals, particularly lead and zinc which have hitherto been fed to the blast furnace again with the remaining flue dust. However, for various reasons their removal is desired.

BRIEF SUMMARY OF THE INVENTION

The object of the present invention is to provide a process for separating heavy metals from flue dust and/or sludge which can be performed with relatively simple means.

This and other objects are accomplished by the practice of this invention which comprises three reaction states performed in the aqueous phase:

a. Oxidation of the iron and filtration of the resulting turbid liquid;

b. Suspension and acidification of a first filtration residue and subsequent filtration of the resulting second turbid liquid, whereby a second filtration residue contains mainly iron sludge;

c. Neutralization of the filtrate of the second turbid liquid and subsequent filtration of the resulting third turbid liquid, whereby a filtration residue containing precipitated heavy metals is obtained.

Other and further objects of the present invention will be apparent from the following description and claims and are illustrated in the accompanying drawing which by way of illustration shows a preferred embodiment of the present invention and the principles thereof and what are now considered to be the best modes contemplated for applying these principles. Other embodiments of the invention embodying the same or equivalent principles may be used, and structural changes may be made as desured by those skilled in the art without departing from the invention and the scope of the appended claims.

BRIEF DESCRIPTION OF THE DRAWINGS

The drawing shows an embodiment of an installation for separating iron and heavy metals from flue dust and/or sludge in the form of a diagrammatic flow chart.

DETAILED DESCRIPTION OF THE PREFERRED EMBODIMENTS

The installation shown in the drawing comprises a plurality of reaction vessels, whereof reaction vessels 1, 2, 3 and 4 are shown and which are all advantageously equipped with a stirrer 5. Each action vessel 1 to 4 has a pH measuring device 6 for monitoring the reaction in the individual reaction vessels. In addition, reaction vessel 1 has a redox measuring device 7.

Furthermore a feed line 8 is provided for supplying reaction vessel 1 with flue dust and/or sludge, together with a feed line 9 for water and a feed line 10 with an incorporated metering pump 11, via which hydrogen peroxide is supplied in regulated quantity to reaction vessel 1 from storage tank 12. On the discharge side reaction vessel 1 is connected with a filtering device 14, e.g., a filter press via a pipe 13. A filter pump 15 is incorporated in pipe 13. The filtration residue is passed from filtering device 14 via a feed line 16 to reaction vessel 2, while the filtrate is drained off via a pipe 17.

Reaction vessel 2 has a stirrer 5, a feed line 9 for water, a pH measuring device 6 and a feed line 18 with an incorporated metering pump 11, via which concentrated hydrochloric acid, e.g., 50% concentration, is passed in regulated quantity to reaction vessel 2 from a storage tank 19. On the discharge side, reaction vessel 2 is connected with a filtering device 21, e.g., a filter press via a pipe 20. A filter pump 22 is incorporated in pipe 20. From filtering device 21, the filtrate is passed via a feed line 23 to reaction vessel 3, while the filtration residue which mainly consists of iron sludge is removed via a discharge pipe 24.

Reaction vessel 3 has a stirrer 5, a pH measuring device 6 and a feed line 25 with a metering pump 11 via which soda solution, e.g., a 10% aqueous solution of $Na_2CO_3$, filtering device 28, e.g., a filter press. A filter pump 29 is incorporated in pipe 27. From filtering device 28 the filtrate is passed via a feed line 30 to reaction vessel 4, while the filtration residue, mainly lead sludge, is removed via a discharge pipe 31.

Reaction vessel 4 has a stirrer 5, a pH measuring device 6 and a feed line with a metering pump 11, via which milk of lime, e.g., a suspension of calcium hydroxide in water, is supplied in regulated quantity to reaction vessel 4 from the milk of lime preparation plant 33 comprising the calcium hydroxide storage silo, the actual preparation plant and the storage container for the milk of lime. On the discharge side the reaction vessel 4 is connected via a pipe 34 with a filtering device 35. A filter pump 36 is provided in pipe 34. From filtering device 35 the filtrate which no longer contains dissolved heavy metals is discharged via a pipe 37, while the filtration residue mainly consisting of zinc sludge is removed via discharge line 38.

In addition, each of the two reaction vessels 3 and 4 have a feed line 39 and 40 with an incorporated metering pump 41 and 42. Feed lines 39 and 40 are connected to a pipe 43 via which flocculation aid solution is supplied in regulated quantities to the reaction vessels 3, 4 from a preparation plant 44.

By means of the desired installation the flue dust and/or sludge is supplied in weakly alkaline form, whereupon the divalent iron contained in the flue dust and/or sludge is oxidized in reaction vessel 1 by adding hydrogen peroxide. The ferric hydroxide obtained is not in this form attacked by hydrochloric acid. After filtering the turbid liquid pumped from reaction vessel 1 by filter pump 15 in filtering device 14, the filtration residue is passed into reaction vessel 2 while the aqueous phase is removed. The solids of the filtration residue from filtering device 14 are suspended in water and acidified to pH 5 by adding concentrated hydrochloric acid, whereby the zinc and lead dissolve but the iron remains largely undissolved. During the subsequent filtration process in filtering device 21 the filtrate containing zinc and lead in dissolved form is passed into reaction vessel 3, whereas the filtration residue consists of iron sludge free from zinc and lead which can be returned to the blast furnace process.

In reaction vessel 3, the pH of the filtrate is adjusted to a value of 6 to 6.5 by adding soda solution, whereby the lead is precipitated by the zinc remains in solution. During the subsequent filtration process in filtering device 28 the filtrate which still contains the dissolved zinc is passed into reaction vessel 4, whereas the filtration residue mainly consisting of lead sludge is renoved for further processing.

In reaction vessel 4, the pH of the filtrate is adjusted to a value of 8.3 by adding milk of lime, whereby the zinc precipitates. During the subsequent filtration in filtering device 35, the filtrate no longer contains any dissolved heavy metals, whereas the filtration residue mainly consists of zinc sludge which can be removed for further processing.

The above described process can either be performed as a batch process or as a semi-continuous process. As the flue dust and/or sludge is obtained continuously, when the process is performed as a batch process, at least two reaction vessels and a corresponding number of filtering devices would be necessary for one reaction stage.

In the described installation, lead and zinc are obtained separately as hydroxide sludges and can therefore also be further processed separately. However, as this separation is not very clearly defined, i.e., the lead sludge contains zinc and the zinc sludge contains lead, it is also possible for these sludges not to be produced separately so that only one heavy metal precipitation need be performed and consequently one of the two reaction vessels 3, 4 with the appropriate equipment would become superfluous.

The invention is not limited to the embodiments described and represented hereinbefore and various modifications can be made thereto without passing beyond the scope of the invention.

What is claimed is:

1. A process for separating iron, zinc and lead from a weakly alkaline flue dust and/or flue sludge wherein said flue dust and/or flue sludge are suspended in aqueous phase comprising the sequential steps of
   treating said aqueous suspension with sufficient hydrogen peroxide so as to oxidize iron whereby said treated aqueous suspension comprises a first liquid phase and a first solid phase;
   separating said first liquid phase and said first solid phase by filtration so as to produce a first filtrate and a first solid residue;
   suspending said first solid residue in an aqueous phase and treating said aqueous suspension of said first solid residue with sufficient hydrochloric acid so as to change the pH of said aqueous suspension of said first solid residue to about 5 whereby said treated aqueous suspension of said first solid residue comprises a second liquid phase and a second solid phase;
   separating said second liquid phase and said second solid phase by filtration so as to produce a second solid residue, consisting essentially of iron sludge and a second filtrate;
   treating said second filtrate with sufficient milk of lime so as to change the pH of said second filtrate to about 8.3 whereby said treated second filtrate comprises a third liquid phase and a third solid phase;
   and separating said third liquid phase and said third solid phase by filtration so as to produce a third solid residue comprising lead and zinc, and a third filtrate substantially free of dissolved heavy metals.

2. A process in accordance with claim 1 wherein said hydrochloric acid comprises concentrated hydrochloric acid.

3. A process for separating iron, zinc and lead from a weakly alkaline flue dust and/or flue sludge wherein said flue dust and/or flue sludge are suspended in an aqueous phase comprising the sequential steps of
   treating said aqueous suspension with sufficient hydrogen peroxide so as to oxidize iron whereby said treated aqueous suspension comprises a first liquid phase and a first solid phase;
   separating said first liquid phase and said first solid phase by filtration so as to produce a first filtrate and a first solid residue;
   suspending said first solid residue in aqueous phase and treating said aqueous suspension of said first solid residue with sufficient hydrochloric acid so as to change the pH of said aqueous suspension of said first solid residue to about 5 whereby said treated aqueous suspension of said first solid residue comprises a second liquid phase and a second solid phase;
   separating said second liquid phase and said second solid phase by filtration so as to produce a second solid residue, consisting essentially of iron sludge and a second filtrate;
   treating said second filtrate with sufficient soda solution so as to change the pH of said second filtrate to between about 6.0 and 6.5 whereby said treated second filtrate comprises a third liquid phase and a third solid phase;
   separating said third liquid phase and said third solid phase by filtration so as to produce a third solid residue, consisting essentially of lead sludge, and a third filtrate;
   treating said third filtrate with sufficient milk of lime so as to change the pH of said third filtrate to about 8.3 whereby said treated third filtrate comprises a fourth liquid phase and a fourth solid phase;
   and separating said fourth liquid phase and said fourth solid phase by filtration so as to produce a fourth solid residue consisting essentially of zinc, and a fourth filtrate substantially free of dissolved heavy metals.

4. A process in accordance with claim 3 wherein said soda solution comprises a 10% aqueous solution of $Na_2CO_3$.

* * * * *